Patented Aug. 7, 1928.

1,679,943

UNITED STATES PATENT OFFICE.

CHAUNCEY U. PRACHEL AND LEONARD E. BRANCHEN, OF ROCHESTER, NEW YORK, ASSIGNORS TO EASTMAN KODAK COMPANY, OF ROCHESTER, NEW YORK, A CORPORATION OF NEW YORK.

PROCESS FOR REDUCING THE VISCOSITY CHARACTERISTICS OF CELLULOSE ETHERS AND PRODUCTS THEREOF.

No Drawing.   Application filed December 21, 1925.   Serial No. 76,888.

This invention relates to processes for reducing the viscosity characteristics of cellulose ethers and to the products thereof. One object of the invention is to provide a relatively simple, inexpensive and accurately repeatable process for lowering the viscosity of cellulose ethers, whether the latter be in powdered form or in the form of films, filaments, dopes, etc. Another object of the invention is to provide a process in which the lowering of the viscosity characteristics of the cellulose ether may be accomplished without expensive or troublesome heat or pressure equipment. Still a further object of the invention is to provide a process in which the treatment may be carried out by using relatively cheap, spent or sludge acids. Another object is to produce cellulose ethers having low viscosity characteristics, which will nevertheless form films having good flexibility. Other objects will hereinafter appear.

This application continues in part certain subject matter found in our prior application No. 25,128, filed April 22nd, 1925, for process for reducing the viscosity characteristics of cellulose ether.

In U. S. Patent No. 1,188,376, Lilienfeld, June 20, 1916, there are disclosed a series of alkyl ethers of cellulose. Certain of these are practically insoluble in water, and since they are at present the most important members of the series, we shall describe our invention in connection with them. But it should be understood that the invention is not restricted to them, except as indicated in the appended claims.

When cellulose ethers, such as water-insoluble ethyl cellulose, are dissolved in volatile solvents along with other less volatile materials they can be used as lacquers or varnishes and will produce films of good flexibility. The solutions or dopes are applied in a relatively thin layer upon a suitable surface, such as a clean metallic surface, and the volatile ingredients are caused to evaporate from such layer until the latter sets to a hard coating. It is desirable to have the dopes low in viscosity and yet high in the percentage of dissolved cellulose ether, and at the same time preserve flexibility in the coatings or films.

We have found that cellulose ether dopes of high concentration and low viscosity, which yield coatings or films of good flexibility, may be prepared by treating the cellulose ether with an acid under conditions which do not harmfully degrade or decompose it. Organic acids and mineral acids are both suitable. The effect is not confined to the action of any particular acid. Since spent or sludge acids which have been used in nitrating cellulose are inexpensive materials and can be diluted readily, they serve our purpose excellently but the invention is not limited to their use. Of course, the concentration in which such cheap sludge acid is employed is less than that which will nitrate the material which is treated.

The process may be carried out at atmospheric pressure, thus eliminating the trouble and expense of special vessels of the autoclave type. Furthermore, while the process can be accelerated by increasing the temperature, it can be carried on at a commercial speed at room temperature. Combined heat and pressure are admissible, so long as the cellulose ether is not decomposed or degraded to produce brittle or highly colored films.

Our process is applicable to the undissolved cellulose ether powder, flakes or fibers, as originally produced, or it may be applied to films or filaments containing the ethers in colloidized form. It is thus applicable to scrap or waste film containing such ethers. It is likewise applicable to solutions of cellulose ether.

We shall now describe several illustrative embodiments of our invention, but it will be understood that we are not limited to the details of these examples, except as indicated in the appended claims.

The cellulose ether, preferably in comminuted form, is treated with a 20% sludge acid from the cellulose nitrating process. The relative proportions of the ingredients therein may vary considerably but we have found it useful to employ an aqueous solution containing approximately 13% of $H_2SO_4$, 7% of $HNO_3$ and 1 to 2% of nitrogen oxides, say $N_2O_4$. If film scrap is being treated it is preferably chopped up and the gelatinous coating removed before the cellulose ether base is acted upon by the acid.

The treatment may take place in any suitable acid-resisting vessel with the cellulose ether material covered by the acid solution. Because of the relatively low temperature at which the action takes place and because of the large amount of water that is present, the loss of valuable oxides of nitrogen is reduced to the minimum. The duration of the treatment is preferably determined by tests. Samples are taken from the treated materials at intervals and tested to see whether the viscosity has been lowered to the desired degree. The time of treatment will vary with the strength of the acid, with the temperature, with the degree of viscosity-lowering which it is desired to obtain, and with the initial viscosity characteristics of the material before treatment. We have found, for example, that the viscosity of cellulose ether flakes may be reduced to one-third of their initial value of six days' treatment at room temperature. In any event the treatment is much longer than that carried out for a mere purification of the ether as disclosed in U. S. Patent No. 1,448,091, P. C. Seel, March 13, 1923.

A 10% aqueous solution of aqua regia is also useful and may be substituted for the sludge acid mentioned above. The latter is, however, less expensive and, therefore, usually preferred. The aqua regia may contain fuming nitric acid, and, therefore, contain some oxides of nitrogen, though this is not indispensable. The proportions of nitric acid to hydrochloric acid may vary in accordance with those usually present in aqua regia.

In still another example of our process we may substitute for the sludge acid, described above, a 10% solution of nitric acid containing approximately 2% of nitrogen oxide.

In general our preferred baths contain roughly from 5 to 20% of $HNO_3$ and from ½ to 10% of nitrogen oxides, either with or without the presence of $H_2SO_4$ and HCl.

The process may be carried out with sulfuric acid. For example, we may heat the comminuted cellulose ether powder or film in a 1% solution of sulfuric acid. This may conveniently be done under reflux conditions. The duration of the treatment is always far greater than the treatment of freshly prepared cellulose ether with sulfuric acid to purify it. We have even carried out this treatment for nearly 90 hours without harmfully degrading the product.

Hydrochloric acid can be employed in our process. For example, we may heat the cellulose ether powder, or comminuted cellulose ether film, under reflux conditions in a 1% solution of hydrochloric acid, say for about 15 to 40 hours. When the hydrochloric acid is to act at room temperature we prefer to use a 5% solution.

The organic acids are useful in carrying out our process. For example, we may heat the cellulose ether powder or comminuted cellulose ether films under reflux conditions in a 10% solution of the acid, such as oxalic acid, acetic acid, or tartaric acid, or mixtures of them. While we prefer to use heat in connection with the organic acids in order to hasten the operation, nevertheless they will operate at room temperature. But the action requires considerably longer. We have obtained useful reduction in viscosity by treatment with a 10% solution over a period of 30 days.

We may likewise treat the cellulose ethers with acid in order to reduce their viscosity characteristics, while they are in solution in organic solvents. Thus we may dissolve the ethers in well-known solvent mixtures of benzol-ethyl alcohol or methyl acetate-methyl alcohol. The concentration of the cellulose ether in the solution is not controlling but we find it convenient to have one part by weight of cellulose ether to about 4 to 7 parts by weight of the mixed solvent. The acid, preferably in a small percent, is introduced into such dopes, being thoroughly mixed therein. It may be premixed with some of the solvent before it is introduced into the mass in order to prevent undue local action. With mineral acid we find it convenient to use about 1% of the weight of the cellulose ether contained in the dope to be treated. The cheaper of these acids are preferred, such as sulfuric acid, or hydrochloric acid or nitric acid. Organic acids, such as those mentioned above, can likewise be employed in the same proportion; but the action is slower and their percentage can be increased without harm.

When the cellulose ethers in the dopes have been sufficiently altered, as regards their viscosity characteristics, the acid may be neutralized, to prevent further action, or the ether may be separated from the solvent and thoroughly washed free from acid. This separation can be done by the precipitating dope in an aqueous bath; but where is is desirable to recover the volatile solvent the dope may be shaped into the form of films or filaments and the volatile solvents, evaporated from these shapes can be recovered in the usual manner.

After the treatment is finished in the above examples, where the solid forms of ethers are acted on, the transformed cellulose ether is freed from the acid. This may be done by draining off the bulk of the acid from the material and then washing the latter in successive changes of water. To hasten the action the water may be heated without injury to the product. For example, after being washed in running water for several days, it may be treated in several changes of heated water at about 75° C. for instance. Finally the material is either dried or dehydrated with non-aqueous liquids.

It is then ready for use and may be dissolved in the usual cellulose ether solvents, such as a mixture of equal parts of benzol and ethyl alcohol, such solutions exhibiting reduced viscosity, even when the cellulose ether is present in a relatively high concentration. While these solutions are especially useful in making lacquers, nevertheless they may be used alone, or mixed with higher viscosity cellulose ethers in making film.

We prefer to carry the reduction in viscosity to the point where a 20% solution of the cellulose ether in a mixture of 90% of methyl acetate with 10% of methyl alcohol has a viscosity of less than 1500 centipoises at room temperature, say 68° F. For lacquer work the reduction in viscosity may be carried still further, even to 300 centipoises under the above conditions.

The cellulose ethers which have a viscosity of less than 1500 centipoises, under the above conditions are, we believe, new products not heretofore available. While it is possible to produce cellulose ethers directly during the etherification which will have this low viscosity, they are extremely brittle and, therefore, of little or no utility in the varnish and film making art. On the other hand, where the ethers are made so as to have initially high viscosity characteristics, they form coatings or films of high and useful flexibility both before and after their viscosity has been reduced. In other words, direct etherification of the prior art can be made to yield a product which answers the two requirements of high solubility and low viscosity characteristics but it can not simultaneously provide the third essential, namely, the ability to provide films or coatings of good flexibility.

Having thus described our invention, what we claim as new and desire to secure by Letters Patent is:

1. The process of treating cellulose ether which comprises acting thereon with an acid until the viscosity characteristics of said cellulose ether are lowered at least one-third.

2. The process of treating cellulose ether, which comprises acting thereon with a mixture of an acid and a liquid which is chemically inert with respect to said cellulose ether until the viscosity characteristics of the cellulose ether are reduced at least one-third.

3. The process of treating cellulose ethers which have a viscosity greater than 1500 centipoises when made into a 20% solution in a solvent comprising 90 parts of methyl acetate and 10 parts methyl alcohol at 68° F., which comprises acting on said cellulose ether with an acid until its viscosity in said solution at said temperature is less than 1500 centipoises.

4. The process of treating water-insoluble cellulose ether which comprises acting thereon with an aqueous acid solution containing nitric acid until the viscosity characteristics of said ethyl cellulose are lowered at least one-third.

5. The process of treating cellulose ethers which have a viscosity greater than 1500 centipoises when made into a 20% solution in a solvent comprising 90 parts of methyl acetate and 10 parts of methyl alcohol at 68° F., which comprises acting thereon with a mixture of water and spent acids from a nitrating bath until the viscosity of said cellulose ether when tested in said solution at said temperature is less than 1500 centipoises.

6. The process of treating cellulose ether, which comprises acting thereon with an aqueous solution of nitric acid having from 5 to 20% strength until the viscosity characteristics of the said cellulose ether are reduced at least one-third.

7. The process of treating water-insoluble ethyl cellulose which comprises acting thereon with an aqueous acid solution until the viscosity characteristics of said ethyl cellulose are lowered at least one-third.

8. The process of treating water-insoluble ethyl cellulose which comprises acting thereon with an aqueous solution of mineral acid until the viscosity characteristics of said ethyl cellulose are lowered at least one-third.

9. Cellulose ether capable of forming flexible coatings and films and having a viscosity of less than 1500 centipoises when made up into a 20% solution in a solvent containing 90% of methyl acetate and 10% of methyl alcohol at 68° F.

10. Water-insoluble ethyl cellulose capable of forming flexible coatings and films, said ethyl cellulose having viscosity of less than 1500 centipoises and more than 300 centipoises when made up into a 20% solution in a solvent comprising 90% of methyl acetate and 10% of methyl alcohol at 68° F.

Signed at Rochester, New York, this 1st day of December, 1925.

CHAUNCEY U. PRACHEL.
LEONARD E. BRANCHEN.